1,974,407

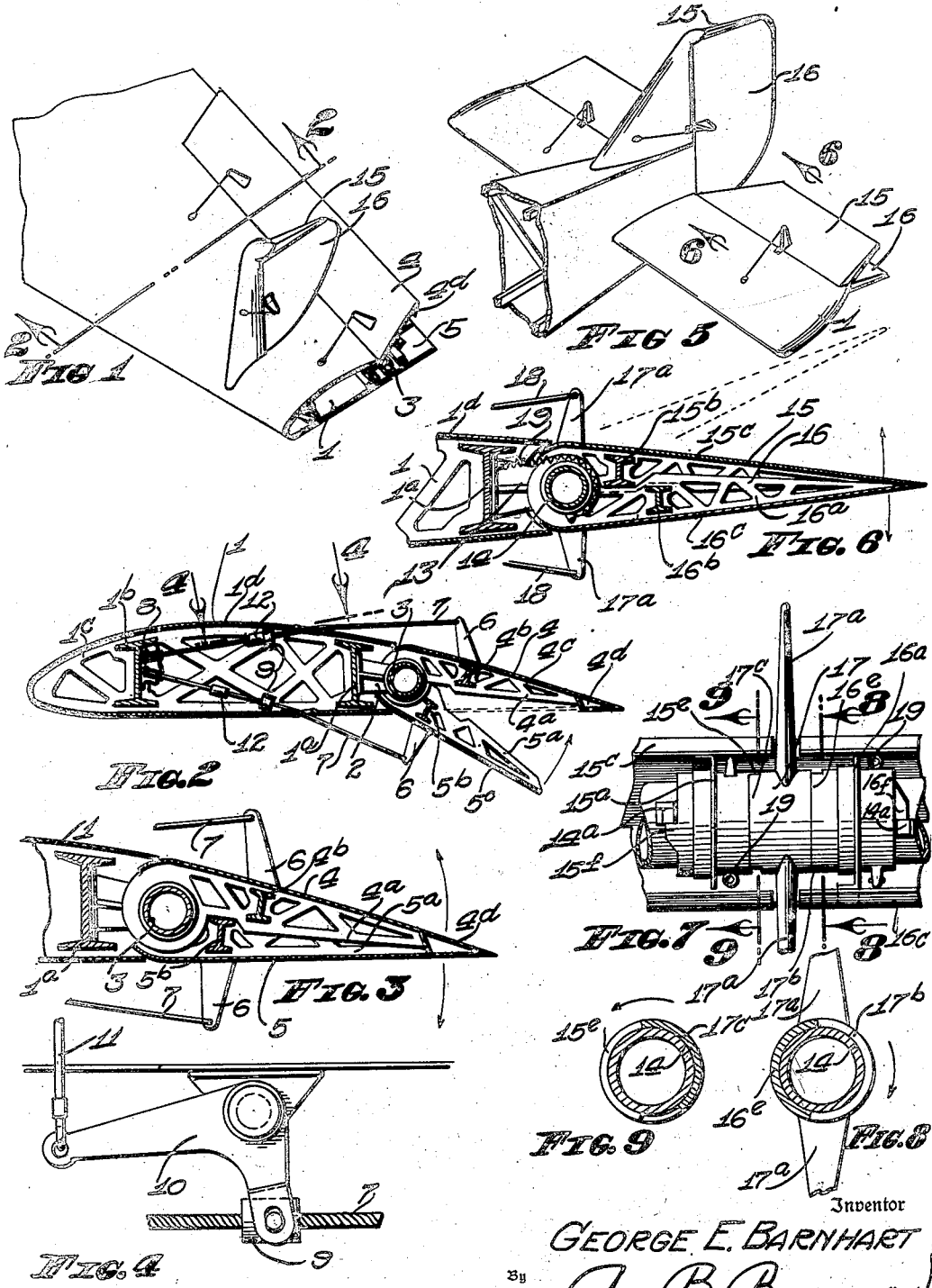
Sept. 25, 1934.  G. E. BARNHART  1,974,407
AIRFOIL CONSTRUCTION
Filed Aug. 24, 1932
Inventor
GEORGE E. BARNHART
By A. B. Bowman
Attorney Patented Sept. 25, 1934

UNITED STATES PATENT OFFICE 1,974,407

AIRFOIL CONSTRUCTION

George E. Barnhart, Pasadena, Calif.

Application August 24, 1932, Serial No. 630,208

10 Claims. (Cl. 244—29)

My invention relates to airfoil construction, more particularly to airfoils used in maneuvering an aircraft, and the objects of my invention are:

First, to provide an airfoil suitable for any of the control surfaces of an aircraft and which is particularly efficient in its action whereby its size may be reduced and yet retain proper control of the aircraft;

Second, to provide an airfoil which is equally applicable to the rudder, elevator or aileron of an aircraft;

Third, to provide an airfoil wherein a pair of control flaps are provided along its trailing edge and are so arranged as to occupy a complementary position in which their action is neutral and to shift independently or simultaneously away from such neutral position so as to effect the control of the airfoil;

Fourth, to provide an airfoil of this class incorporating a pair of control flaps in which each control flap is operable in only one direction with respect to its normal position, the flaps being restrained from moving in unison;

Fifth, to provide an airfoil having dual control surfaces at its trailing edge which are maintained in their normal or inactive position by the air flow around the airfoil;

Sixth, to provide an airfoil having dual control flaps along its trailing edge which are independently adjustable relative to each other so as to occupy normal positions tending to correct unbalanced forces present during normal flight, such as tail heaviness or nose heaviness;

Seventh, to provide in association with an airfoil of the class described a novel control means for accomplishing both unbalanced force correction, as well as maneuvering of the aircraft;

Eighth, to provide an airfoil which is particularly suited for use as an aileron, there being provided a pair of flaps, one larger than the other, so as to exert equal forces when moved within equal ranges so that opposed maneuvers of the aircraft are accomplished with equal facility;

Ninth, to provide an airfoil structure which is particularly adapted for use as a wing tip rudder for controlling side slipping or spinning, or directional control;

Tenth, to provide a novel means of supporting dual or complementary airfoil control flaps relative to an airfoil; and, Eleventh, to provide on the whole a novelly constructed airfoil which is durable, simple of construction, and which will not readily deteriorate or get out of order.

With these and other objects in view as will appear hereinafter, my invention consists of certain novel features of construction, combination and arrangement of parts and portions, as will be hereinafter described in detail and particularly set forth in the appended claims, reference being had to the accompanying drawing and to the characters of reference thereon which form a part of this application, in which:

Figure 1 is a fragmentary perspective view of a wing with its extended end shown in section and illustrating the application of my airfoil construction to an aileron and to a wing tip rudder; Fig. 2 is an enlarged sectional view thereof through 2—2 of Fig. 1 with the upper flap shown in its normal or neutral position, and the lower flap shown extended; Fig. 3 is a fragmentary sectional view similar to Fig. 2, showing the control flaps in their normal positions; Fig. 4 is an enlarged fragmentary sectional view through 4—4 of Fig. 2, illustrating the manner of adjusting the cable guides associated with the control flaps; Fig. 5 is a perspective view of the rear portion of an airplane, showing the application of my airfoil structure to the elevators and rudders of an airplane; Fig. 6 is an enlarged fragmentary sectional view through 6—6 of Fig. 5, showing the control flaps in their closed positions; Fig. 7 is an enlarged sectional view through 7—7 of Fig. 6, parts and portions being shown in elevation; and, Figs. 8 and 9 are transverse sectional views through 8—8 and 9—9, respectively, of Fig. 7, illustrating a manner of limiting the range of movement of the control flaps.

Like characters of reference refer to similar parts and portions throughout the views of the drawing.

Airfoil body portion 1, brackets 2, journal tube 3, upper flap 4, lower flap 5, horns 6, cables 7, pulleys 8, adjustable cable guides 9, adjusting levers 10, guide controlling cables 11, stops 12, brackets 13, journal tube 14, upper flap 15, lower flap 16, operating collar 17 cables 18, and springs 19 constitute the principal parts and portions of my novel airfoil construction.

An airfoil body portion 1 is provided which includes a rear spar $1a$, a forward spar $1b$ connected by ribs $1c$ over which is positioned a covering $1d$, much in the manner of the conventional airfoil. Along its trailing edge wherever control surfaces are desired, the covering and ribs are cut away. At these portions the rear spar $1a$ supports several rearwardly extending brackets 2 which are secured at their extremities to a journal tube 3 mounted in parallel disposed relation with the rear spar $1a$.

The journal tube 3 journals a pair of complementary flaps 4 and 5 which when in their normal or inoperative positions complete the airfoil section of the body portion 1. The upper flap 4 is longer than the lower flap 5 and is provided with a series of ribs 4a terminating at their forward extremities in bearing portions which fit on the journal tube 3. The ribs 4a are reinforced by a spar 4b and are provided with a covering 4c over their upper edges which forms a continuation of the covering 1d. Inasmuch as the rear extremity of the upper flap overhangs the lower flap, the covering 4c is doubled back forming a trailing edge portion 4d.

The lower flap 5 is similarly constructed in that it comprises a series of ribs 5a reinforced by a spar 5d and provided with a covering 5c secured to the lower edges of the ribs 5a. The ribs 5a are provided with journals at their forward portions which fit around the shaft or journal tube 3. The ribs 4a and 5a of the two flaps are staggered so that their thickness may be greater than half the width between the surfaces formed by the flaps.

The flaps 4 and 5 are provided with horns 6 which extend outwardly therefrom, the extended ends of which are attached to cables 7 which pass through the covering 1d and around pulleys 8. The cables 7 pass through adjustable cable guides 9 which are adapted to be shifted back and forth upon the cables by means of levers 10 operated by guide controlling cables 11, as shown best in Fig. 4. Secured to the cables 7, so as to engage the adjustable guides 9, are stops. The stops and guides are so positioned that the stops are in engagement with the guides when the flaps 4 and 5 are in their neutral or normal positions, shown in Fig. 3. By adjusting the cable guides 9, the flaps can be shifted in unison one way or the other a slight amount in order to compensate for unbalanced forces, or the flaps may be held in a slightly separated position, either one or the other, or both of them, being held away from their normal or complementary positions, shown in Fig. 3.

The structure, illustrated in Figs. 2, 3 and 4, while illustrated as an aileron, is equally applicable to any control surface in which adjustment of the normal position of the flaps is desirable. Likewise, the structure, illustrated in Figs. 6 to 9, while shown as a portion of the tail group of an airplane, is equally applicable to aileron construction, or wing tip rudder construction. The structure, illustrated in Figs. 6 to 9, is similar in most respects to the first described structure, particularly in that the structure comprises a pair of flaps hinged to the rear portion of an airfoil body element or portion 1. As in the structure illustrated, particularly in Figs. 2 and 3, there is provided a series of rearwardly directed brackets 13 which support at their extended ends a journal tube 14 arranged in parallel disposed relation with the rear spar 1a from which the brackets extend.

The journal tube 14 supports a pair of flaps 15 and 16, each of which comprises spaced apart ribs 15a and 16a, respectively, reinforced by spars 15b and 16b, and provided at their outer sides with a covering 15c and 16c, respectively.

The ribs 15a and 16a are provided with bearings which fit upon the journal tube 14. Between certain of the bearings 15d and 16d, there is provided an operating collar 17 which journals on the tube 14 and is provided with horns 17a extending radially through the coverings 15c and 16c. The horns are joined to control cables 18. The opposite axial extremities of the collar 17 are provided with lugs 17b and 17c. These lugs are adapted to be engaged by corresponding lugs 15e and 16e of the bearing. The several lugs are so arranged, as illustrated particularly in Figs. 8 and 9, that each flap is shifted outwardly only by the corresponding lug of the collar 17. The remaining extremities of the bearings are provided with bosses 15f and 16f which engage stops 14a secured to the tube 14 when the flaps are in their normal complementary positions.

The difference in the areas of the flaps 4 and 5 tends to compensate for the difference in force exerted by the flaps by reason of their positions. This arrangement may move the flaps to produce the same action when turned through similar arcs.

In both the structures illustrated, the control cables need only operate to shift the flaps outwardly from their normal positions for the slipstream around the body portion and the flaps hold them in their normal positions as limited by the stops or the adjustable guides.

However, in order to maintain the control flaps in their closed position when the airplane is at rest, springs 19 may be provided which connect to the flaps in such a manner as to yieldably retain them in their normal or complementary positions. This arrangement is particularly desirable in connection with rudders and elevators inasmuch as these are in the form of balanced airfoils and the forces produced to retain the lowermost flap in position is not very great.

Though I have shown and described a particular construction, combination and arrangement of parts and portions, and a certain modification thereof, I do not wish to be limited to this particular construction, combination and arrangement, nor to the modification, but desire to include in the scope of my invention the construction, combination and arrangement substantially as set forth in the appended claims.

Having thus described my invention, what I claim as new and desire to secure by Letters Patent is:

1. An airfoil construction comprising, an airfoil body portion, a journal supported from the rear side of said body portion, a pair of superposed control flaps both hinged upon said journal, so as to rotate about a common axis, said body portion and control flaps together forming an airfoil section when said control flaps are in their normal positions, stop means for restricting the movement of said control flaps to arcs approximately terminating at their normal positions, mechanism for shifting the position of said stop means whereby the normal positions of said control flaps are correspondingly varied, and operating means for independently shifting said control flaps from their normal positions.

2. An airfoil construction comprising, a body portion, a pair of superposed control flaps including coverings on their outer surfaces only, a series of ribs, the ribs of one flap arranged in staggered and overlapping relation to the ribs of the other flap whereby the ribs occupy the major portion of the combined section between the outer surfaces of said flaps, and bearings supported from said ribs, a journal common to the bearings of both control flaps whereby said control flaps are shiftable about a common axis, means supporting said journal from said body portion, said body portion and control flaps together forming an airfoil section, when said control flaps are in their normal positions, and independent means for restricting the movement of each control flap to arcs extending outwardly only from its normal positions.

3. An airfoil construction comprising, a body portion, a pair of superposed control flaps including a series of ribs, the ribs of one flap arranged in staggered relation to the ribs of the other flap, and bearings supported from said ribs, a journal common to the bearings of both control flaps whereby said control flaps are shiftable about a common axis, means supporting said journal from said body portion, said body portion and control flaps together forming an airfoil section, when said control flaps are in their normal positions, means for restricting the movement of said control flaps to arcs extending outwardly only from their normal positions, mechanism for shifting the position of said stop means whereby the normal positions of said control flaps are correspondingly varied, and operating means for independently shifting said control flaps from their normal positions.

4. An airfoil construction comprising, an airfoil body portion, a journal supported from the rear side of said body portion, and a pair of superposed control flaps both hinged upon said journal, so as to rotate about a common axis, the trailing edge of one control flap projecting past the other, whereby the surface of one is greater than that of the other, said control flaps being complementary and forming with said body element, when in their normal positions, a complete airfoil section.

5. An airfoil construction comprising, a body portion, a pair of superposed control flaps including a series of ribs, the ribs of one flap arranged in staggered relation to the ribs of the other flap, and bearings supported from said ribs, a journal common to the bearings of both control flaps whereby said control flaps are shiftable about a common axis, and means supporting said journal from said body portion, the trailing edge of one control flap projecting past the other whereby the surface of one is greater than that of the other, said control flaps being complementary and forming with said body element, when in their normal positions, a complete airfoil section.

6. An airfoil construction comprising, a body portion, a pair of superposed control flaps including a series of ribs, the ribs of one flap arranged in staggered relation to the ribs of the other flap, said body portion and control flaps together forming an airfoil section when said control flaps are in their normal positions, means for restricting the movement of said control flaps to arcs extending outwardly only from their normal positions, stop means for restricting the movement of said control flaps to arcs approximately terminating at their normal position, mechanism for shifting the position of said stop means whereby the normal positions of said control flaps are correspondingly varied, and operating means for independently shifting said control flaps from their normal positions.

7. An airfoil construction comprising, a body portion, a pair of superposed control flaps including a series of ribs, the ribs of one flap arranged in staggered relation to the ribs of the other flap, said body portion and control flaps together forming an airfoil section when said control flaps are in their normal positions, stop means for restricting the movement of said control flaps to arcs approximately terminating at their normal position, mechanism for shifting the position of said stop means whereby the normal positions of said control flaps are correspondingly varied, and operating means for independently shifting said control flaps from their normal positions.

8. In an air foil, a body portion comprising a framework and a covering on said framework, a pair of control flaps at the rear of said body portion, means to mount said control flaps for pivotal movement, one of said flaps being of greater length than the other, said one flap having one surface extending the full length thereof and having a short surface on the opposite side and at the trailing edge, the shorter flap being designed to interengage with the longer flap when both are in their normal positions and having a surface coacting with the short surface of said one flap and form with the body a complete airfoil section.

9. In an airfoil, a body portion comprising a front and a rear spar, brackets mounted on said rear spar, an axle supported on said brackets, a pair of control flaps pivotally mounted on said axle, each of said control flaps comprising a spar member, said spar members being staggered to permit said control flaps to interengage with one another when in their normal position and form with the body portion a complete airfoil section.

10. An airfoil construction embodying an airfoil body portion, a pair of superimposed control flaps hinged upon said body portion, said body portion and control flaps together forming an airfoil section when said control flaps are in their normal position, horns upon said control flaps, cable means on the upper control flap horn to move the upper control flap upwardly, other cable means on the lower control flap horn to move the lower control flap downwardly, means adjustable along the upper control flap cable to limit the downward movement of the upper control flap, other means adjustable along the lower control flap cable to limit the upward movement of the lower control flap, said limiting means being disposed to restrict the flaps to a neutral position, the adjustment of the limiting means being effective to vary the neutral position of the flaps.

GEORGE E. BARNHART.